Jan. 23, 1962   W. FRANTZ ETAL   3,017,865
INFINITELY VARIABLE HYDRAULIC DAMPER AND LOCKING MECHANISM
Filed Feb. 16, 1959   3 Sheets-Sheet 1

INVENTORS
WILLIAM FRANTZ
JAMES G. JOHNSTON
BY
Julian C. Renfro
ATTORNEY

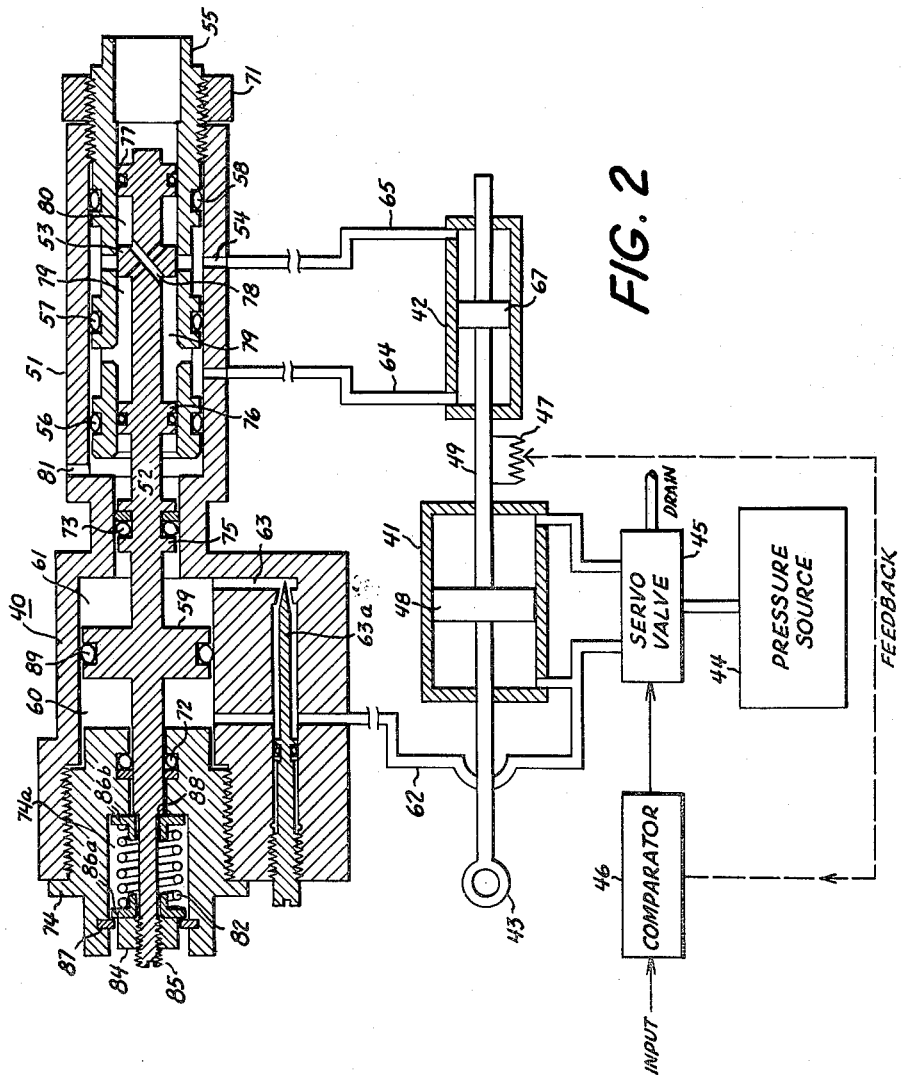

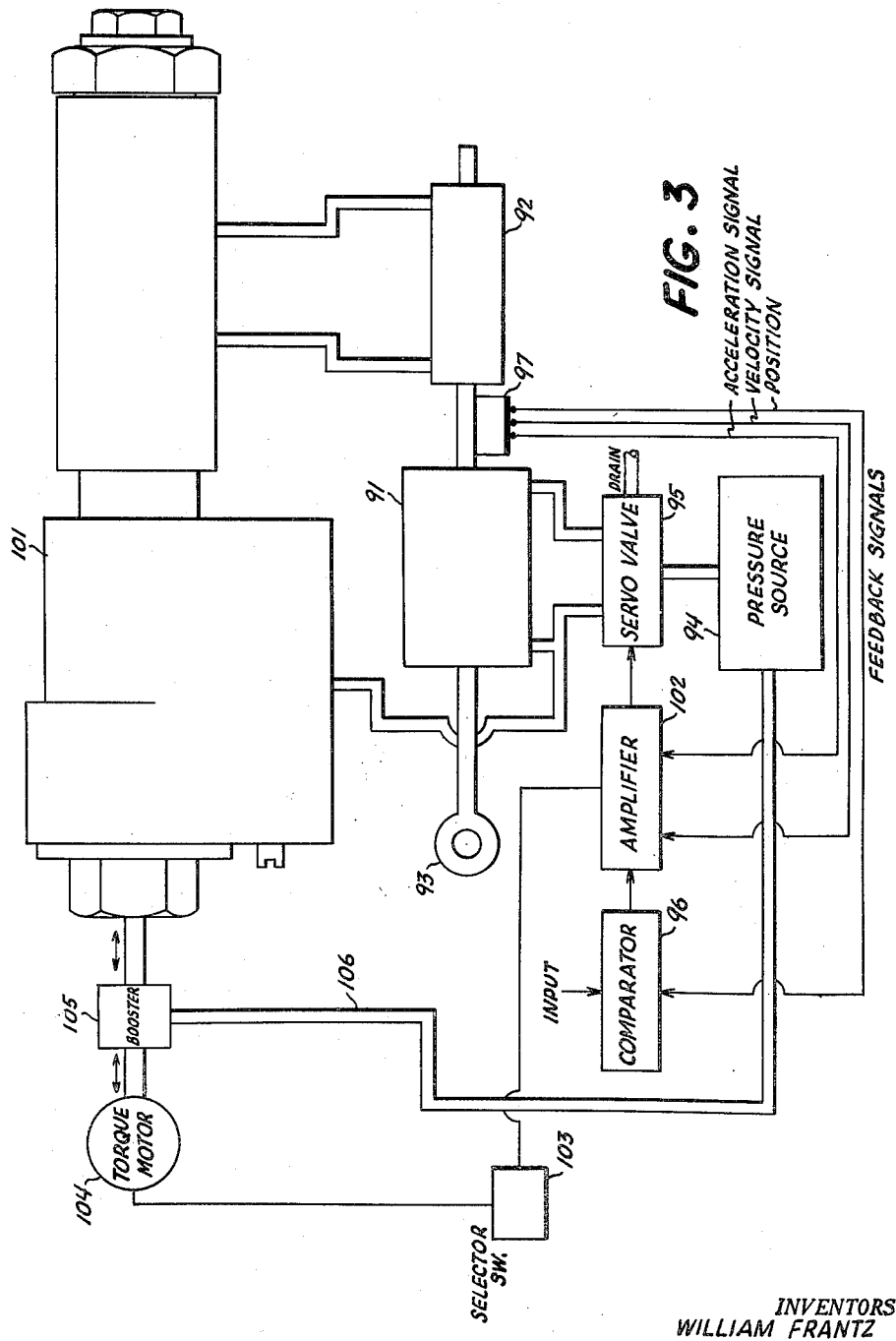

United States Patent Office 3,017,865
Patented Jan. 23, 1962

3,017,865
INFINITELY VARIABLE HYDRAULIC DAMPER
AND LOCKING MECHANISM
William Frantz, Tanglewood, and James G. Johnston, Orlando, Fla., assignors to Martin-Marietta Corporation, a corporation of Maryland
Filed Feb. 16, 1959, Ser. No. 793,533
13 Claims. (Cl. 121—41)

This invention relates to a servo actuation system, and more particularly to a variable rate damping arrangement for providing damping in a servo system to prevent oscillation, yet providing minimum resistance to motion of the servo actuator of the system when rapid corrective movements thereof are required.

Although hot gas and pneumatic control systems offer obvious appeal in missile applications and the like due to their lightness in weight, economy and reliability, such systems have had the accompanying disadvantages of tending to oscillate very undesirably. It is possible to increase the total pressure of the systems as some compensation, but this of course increases the energy requirements of the system. Furthermore, hot gas and pneumatic servo systems have had the disadvantage of requiring an additional error increment when under load, usually in the form of a derivative response complicating the control circuitry, to compensate for the compressibility of the system so that a control surface of the missile, for instance, will not be moved away from a desired position by the aerodynamic forces thereon.

A typical servo system may consist of a servo actuator arranged to actuate a load, a source of pressure for moving the actuator, such as a gas generator, a servo valve for controlling in a desired manner the flow of pressure to the servo actuator, an error comparator, a feedback potentiometer arranged through a servo loop to create a pressure change to restore the servo actuator to a desired position, and a damping device such as a dashpot. However, most dashpots have a fixed characteristic and will therefore produce a resistive force to motion proportional to an exponential of speed. In a system using a compressible fluid, fluctuations in load will generally cause motion of the servo actuator, which in time will be picked up by the feedback potentiometer, which, through the servo loop, will result in a command pressure change to restore the servo actuator to its desired position. A dashpot designed to provide sufficient resistance to motion for relatively small and low frequency load changes can develop excessive resistance when a rapid corrective motion of the actuator is desired. These contradictory requirements can conceivably cause rejection of an actuator system using a compressible fluid, or else result in an oscillatory system of low accuracy and low service life.

According to the present invention, a variable rate damping arrangement is provided in which impedance of a damping means in a servo system can be made to vary inversely with the command signal to the system, and be independent of load variations, making it admirably suited for use with a hot gas or pneumatic servo system. Our variable rate damper is effective to prevent undesired oscillations in a servo system, yet is sensitive to command signals in that the resistance of the servo system can be momentarily decreased upon the presence of a signal to allow rapid movement of the servo actuator of the system. To this end, our variable rate damper system may comprise a servo actuator adapted to be connected in operative relationship with a load, damping means arranged to prevent undesirable oscillations in the system, and a damping rate selector for controlling the amount of damping effect presented by the damping means. The damping rate selector may advantageously comprise a housing, a member moved in response to command signals in the system, and means in said housing moved by said member for regulating the damping of the system to prevent self-oscillation.

The housing may have a fluid passage therethrough for carrying damper fluid, and said means for regulating damping of the system may be a valving member arranged to control the flow of damping fluid through said passage. Upon a command signal, the member moved in response thereto operates the valve member to allow damping fluid to momentarily flow comparatively freely through the housing, thereby reducing the effect of the damping means upon the system, and permitting rapid response by said servo actuator to said command signal.

According to one embodiment, a housing is utilized having two chambers to which separate fluid pressures may be supplied, with the command signal to the system taking the form of a pressure differential resulting from a change in the servo valve output pressure. At steady state, both chambers are at the same pressure through the communication provided by a restricted passage. A fluid-tight pressure sensitive member is provided in each chamber so as to be subjected to the respective pressures of the chambers according to this embodiment. A portion of each of the pressure-sensitive members is movable, with the movable portions of these members interconnected with a movable member. A fluid passage through the housing is closed by a valving portion of the movable member when this member is in a central position, with the valving portion being movable in either direction away from the central position as a result of pressure differential acting upon the pressure-sensitive members to bring about an uncovering of the fluid passage, thereby to permit the flow of control fluid through the housing.

According to another embodiment, a piston arrangement is arranged to move the valve member in response to differential pressures, the piston being moved in either direction away from a central position in order to move a valve means to bring about a reduction of the damping effect. By such an arrangement, damping can be provided in such a manner as to provide stability for a compressible fluid servo system without resorting to such techniques as employing continuous leakage or other inefficient prior art arrangements for providing stability.

While a position controlling system is treated as primary in this description, it is to be understood that other parameters such as fuel flow, pressure in a flowing system, speed of a prime mover, etc., can be regulated with the techniques herein described, and command signals can be either in the form of pressures or electrical signals.

Other objects, features and advantages of this invention will be apparent from a study of the appended written description, and the drawings in which:

FIGURE 2 illustrates a second embodiment of this invention, in which a piston type of damping rate selector is employed in a typical servo arrangement; and FIGURE 3 is an embodiment generally similar to FIGURE 2 but employing electrically responsive components.

Figure 1:
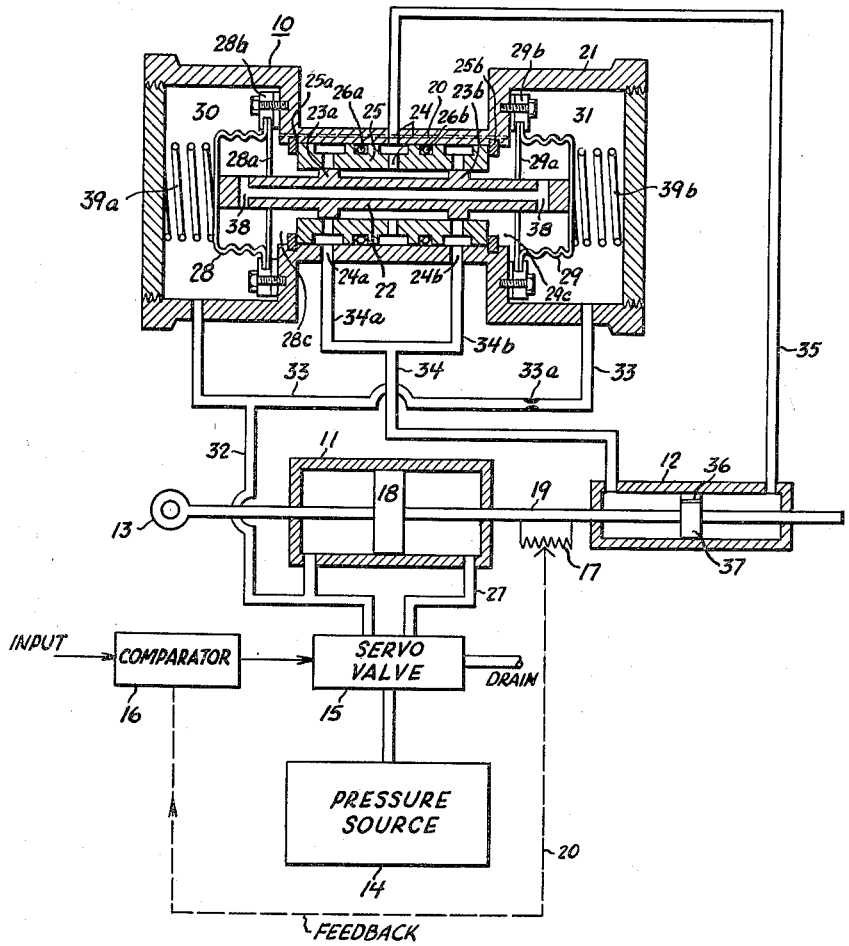
FIGURE 1 illustrates partly in section a typical servo system according to this invention, in which a first embodiment of a novel damping rate selector is employed.

Turning to FIGURE 1, a first exemplary arrangement is illustrated comprising damping rate selector 10, a servo actuator 11 connected to operate a load, and a damping means 12, such as a hydraulic dashpot as illustrated, operatively connected with actuator 11 such as by connecting rod 19. The load, which would typically be connected at load fitting 13, may be the control surface of a missile, aircraft, or the like, or even a component of an industrial machine, such as a cutting tool or work positioning device. The piston 18 of the servo actuator is positioned by pressure from a pressure source 14 as a result of movements of servo valve 15, which controls the application of pressure to appropriate sides of the actuator.

Error comparator 16 provides an error signal to servo valve 15, and this error comparator may be of the type including an amplifier so that it can bring about direct operation of the servo valve. This error signal is derived by comparing the motion of the actuator as read by potentiometer 17 to the input command. That is to say, if a small change occurs in the input command emanating from a pilot of an aircraft, the guidance system of a missile, etc., an error signal is generated which moves the servo valve and applies pressure to one side of the actuator, thereby causing motion which is fed back by potentiometer 17 through connection 20 and compared to the input. When the motion of the output equals the input change, the error is reduced to zero and the motion of the actuator ceases for the time being, that is, until the next command signal.

The damping rate selector 10 principally comprises a housing 21 in which a movable member such as a valve member 22 is slidable in sealed relation in the central portion of the housing. Valve member 22 has valving surfaces 23a and 23b thereon which are responsible for controlling flow through a fluid passage 24 in the housing. When the valve 22 is in the central position shown in FIGURE 1, the valving surfaces 23a and 23b occlude passages 24a and 24b, respectively, which constitute a pair of alternate paths for the fluid flowing through passage 24. When the valve member is on either side of the central position, one or the other of the secondary passages 24a or 24b will thereby be opened to allow the flow of fluid through passage 24, the direction of flow being dependent upon the direction in which the servo actuator and the movable member of the damping means are tending to move. As illustrated, a sleeve 25 may be provided in which the movable member is slidable, thus facilitating the proper no-flow adjustment of the valving surfaces with respect to the ports associated with fluid passage 24. Appropriate O rings 26a and 26b or the like are provided about the sleeve in the event same is used, to assure a close, sealed relation, and fastening means such as snap rings ("split rings") 25a and 25b prevent undesired displacement of the sleeve in the housing.

As previously indicated, movable member 22 is positioned as a result of a differential in pressure existing in chambers 30 and 31 of said housing. Bellows 28 and 29 having equal areas are located in chambers 30 and 31 respectively, and are disposed in sealed relation with the chambers so as to be effectively responsive to chamber pressure. Bellows 28 and 29 contain a suitable fluid, as hereinafter discussed. Conduit 32 connected to apply command pressure from the servo valve to one side of servo actuator 11 also connects to chamber 30 so that the positioning of bellows 28 therein will be effected by the command pressure. Conduit 33 connected with conduit 32 leads to chamber 31, but in latter conduit is a restriction 33a which may be a variable restriction if desired. Because of this restriction, the effect of a command signal will be felt more rapidly and more strongly in chamber 30, and in the event the signal is positive, will cause bellows 28 to be compressed somewhat and thereby shift movable member 22 to the right as shown in FIGURE 1, which of course causes valving portion 23b to move so as to bring about the opening of passage 24. After a short time delay, pressure is manifested into chamber 31 through conduit 33 to bring about an equalization in the housing. This allows centering springs 39a and 39b to shift movable member 22 back to its central position in which fluid passage 24 is occluded. Conduit 27 interconnects servo valve 15 to the end of actuator 11 remote from conduit 32, so that servo piston 18 can be readily driven by pressure fluid in either direction away from the position illustrated.

Opposite ends of the damping device, dashpot 12, are interconnected by conduits 34 and 35, which are connected to housing 21 on opposite sides of fluid passage 24. Branches 34a and 34b allow flow through passage 24a or 24b, whichever may be open as a result of movement of member 22. Although a small orifice 36 may be provided in dashpot piston 37 so that fluid may tend to escape from one end of the dashpot through the orifice into the other end of the dashpot upon movement of piston 37, the primary capability of the dashpot to accommodate rapid changes in position of servo actuator 11 is dependent upon the amount of restriction that is presented by the damping rate selector 10 to the flow of fluid from the ends of the dashpot through fluid from the ends of the dashpot through fluid passage 24 via conduits 34 and 35.

Although the selection of a damping fluid for dashpot 12 is not critical to this invention, we prefer a silicone liquid possessing a low coefficient of expansion for this purpose. In the event an ambient reference pressure in the bellows is not appropriate, such as due to the high operating pressures of the servo system, a liquid may be employed in the bellows, in which event pressure balance ports 38 may be employed. Seal diaphragms 28a and 29a are utilized in conjunction with bellows 28 and 29, respectively, to prevent the entrance of damping fluid if hot gas is used. The outer peripheries of these diaphragms are sealed to the bellows and to mounting rings 28b and 29b. These mounting rings are secured such as by a plurality of bolts to housing 21.

Radially inner portions of each diaphragm are sealed to movable member 22, with the flexibility of each diaphragm being such as to permit movement of member 22. We have found that stainless steel construction for the diaphragms is preferred, such as of a thickness of .002, which is sufficiently flexible to allow for movement of the central portions thereof. Passage 20 provides interconnection between cavities 28c and 29c to prevent hydraulic lock.

The operation of FIGURE 1 in the intended manner may come about as the result of a positive command pressure directed to servo actuator 11, tending to cause it to move so as to manipulate a control surface of a missile or aircraft in a desired direction, for example. Due to the restriction 33a in conduit 33, this command pressure is manifested more rapidly and more forceably in chamber 30 than in chamber 31, thereby causing bellows 28 to be compressed somewhat with respect to its previous position, extending bellows 29, and causing movable member 22 to move to the right as shown in FIGURE 1. This of course causes valving portion 23b to unblock fluid passage 24b and allow damping fluid contained in damping device 12 to move from one end of the device to the other to allow a rapid movement of servo actuator 11 to take place.

After a time delay established by physical dimensions of chambers 30 and 31, orifice size 33a, and pressure levels, command pressure is manifested in chamber 31 via conduit 33, equalizing the pressure in chambers 30 and 31, and allowing centering springs 39a and 39b to bring about a return of movable member 22 to its neutral position. This causes valving portions 23a and 23b to again restrict flow through fluid passage 24, thus allowing dashpot 12 again to be effective to prevent undesired oscillations in the servo system. In this fashion the impedance is made to vary as a function of the command signal, i.e., for maximum actuator velocity the greater will be the command signal pressure change, and the less will be the impedance. As should be obvious, negative changes as well as positive changes in command pressure may occur, but in either event, the change will be felt in chamber 30 before being felt in chamber 31, due to the restriction 33a in conduit 33. In the event of a negative change in pressure, the result is to move member 22 momentarily to left as viewed in FIGURE 1, to allow rapid movement of the actuator to take place.

Turning now to FIGURE 2, a second embodiment of a variable rate damper arrangement is illustrated in which the damping rate selector 40 is operatively connected to servo actuator 41 by virtue of conduit 62. Damping device 42 is interconnected by rod 49 with servo actuator 41 so as to be moved as a result of movements of piston 48, thus to be effective to prevent undesired oscillations in the system. Load fitting 43, pressure source 44, servo valve 45, and error comparator 46 are utilized in the system in the same general manner as their counterparts in FIGURE 1, elements 13—16.

Housing 51 of damping rate selector 40 utilizes a movable member 52 therein that is effective to bring about a desirable variation of the resistance of dashpot 42. The command pressures to servo actuator 41 travel via conduit 62 to housing 51 and are manifested in chamber 60, so as to act against piston 59 that is responsible for the positioning of movable member 52. Restricted conduit 63 allows the command signal to ultimately be manifested in chamber 61 so as to act upon the opposite side of piston 59 after a time interval determined by the position of variable restrictor 63a.

Motion of movable member 52 of course controls the position of valving portion 53 to regulate the flow of damping fluid through fluid passage 54 in housing 51 in such a manner as to bring about a desired amount of damping of the movements of servo actuator 41 by damping means 42. Details of ancillary fittings and conduits normally associated with a servo actuator in a servo system have been omitted for reasons of clarity.

For convenience and accurate positioning of valving portion 53 with respect to fluid passage 54, adjustable sleeve 55 is provided, which is positioned by being threaded into housing 51. By virtue of sleeve 55, the setting of the valving portion 53 with respect to the occluding of fluid passage 54 is an initial adjustment that may easily be made when the device is being placed in actual use. Lock nut 71 may be utilized on the threaded portion of sleeve 55 to prevent an undesired movement or orientation thereof. O-rings 56, 57 and 58 are provided upon sleeve 55 so that it will fit in sealed relation in housing 51.

Leakage from chambers 60 and 61 is prevented by appropriate seal 72 and 73 such as O-rings that provide a closely fitted relation between movable member 52 and end fitting 74, as well as between seal retaining land 75 on movable member 52 and the housing portion surrounding it. Lands 76 and 77 immediately surrounding valving portion 53 not only serve to define fluid chambers on either side of the valving surface between movable member 52 and the sleeve, but also they provide sufficient support for the valving portion 53 that it may be maintained in desired alignment and proper slidable relation in the housing. As indicated with regard to FIGURE 1, although the use of a sleeve is preferred construction, this is not mandatory, and the movable member 52 could be directly slidable in housing 51.

Damping fluid entering housing 51 from conduits 64 and 65 connecting housing 51 with the damper 42 may fill the chambers 79 and 80 defined on each side of valving portion 53 between movable member 52 and sleeve 55. This is because of one or more crossover ports 78 in member 52 provide communication between these chambers. However, no operational flow of dashpot fluid may occur through housing 51 until valving portion 53 is moved so as to uncover the port or ports in sleeve 55 that it normally occludes. Orifice 81 is provided in housing 51 for dumping overboard any fluid finding its way past the O-rings into the space between sleeve 55 and land 75.

The assembly of movable member 52 into its housing 51 is simplified because of an end fitting 74 that is threadedly received into the larger end of housing 51. This fitting is readily insertable into or removed from the housing by the use of a wrench or other appropriate tool.

Contained within central cavity 74a of fitting 74 is centering spring 82 responsible for restoring member 52 to its desired center position upon an equalization of pressure occurring in chambers 60 and 61. A nut 84 threadedly received on fitting 85 at the end of member 52 remote from the valving surface is responsible for keeping spring 82 under a desired amount of compression, in order that it may be effective to bias member 52 to its center position in which passage 54 is closed. Appropriate spring retaining washers 86a and 86b are provided at each end of spring 82, with each of these being of a diameter sufficient to firmly contact a portion of fitting 74 upon movement of member 52 taking place. Washer 86a is restrained from movement by nut 84, and washer 86b engages a shoulder 88 created as a result of an undercut on member 52 in the area of spring 82. A snap ring 87 or the like is inserted into spring cavity 74a of fitting 74, to intercept the upper portion of washer 86a upon member 52 moving to the left. In that instance, the shoulder 88 upon which the washer 86b rests represents one fixed end, and washer 86b contacting the snap ring 87 represents the other fixed end, thereby causing spring 82 to be progressively compressed as member 52 moves toward the left. On the other hand, upon member 52 tending to move toward the right, washer 86b is brought into firm contact with the bottom portion of cavity 74a of fitting 74, thus representing a firm base against which spring 82 is compressed upon movement to the right of member 52 taking place. It has been found that nut 84 usually does not have to be adjusted during operation of the device, for a tightening to effect an initial compression of spring 82 has proven sufficient for most applications.

As may be desired, during assembly sleeve 55 may be threaded into housing 51 into the approximately correct location, and the member 52 inserted from the left, with care being taken not to disturb the positions of the O-rings thereon. Member 74 is then tightened snugly in place by the use of a wrench or the like, and the desired adjustment of spring 82 made. Adjustment of sleeve 55 may now be made by rotating it such as by a wrench so as to cut off any flow between conduits 64 and 65, this no-flow point of course being the point at which valving portion 52 occludes passage 54. Nut 71 may now be tightened in order to hold sleeve 55 against dislodgement from this desired location.

The embodiment according to FIGURE 2 may advantageously be employed for use with a hot gas servo system in which the motivating fluid for operating the movable member 52 is secured from a pressure source such as a rocket engine, a jet engine, or a separate hot gas generator. Because of higher temperatures then involved, piston 59 would typically be fitted with one or more metallic piston rings rather than O-ring 89, which is of course suitable for pneumatic use.

As should be obvious, the operation of the embodiment according to FIGURE 2 is brought about by the selective porting of high pressure fluid by servo valve 45 to opposite sides of servo actuator 41 to bring about desired operation of the control surface or the machine to which fitting 43 is attached. Pressure changes, both positive and negative, are manifested to conduit 62 and because of the connection with variable rate damper 40, these pressure changes bring about movement of piston 59 in one or the other direction away from the centered position illustrated in the drawing. The damping effect of damping means 42 is markedly decreased at such time as valving portion 53 uncovers fluid passage 54, for in that event, fluid contained in damping means 42 can readily travel from one side of piston 67 to the other through fluid passage 54 and the conduits 64 and 65 connecting this passage with dashpot 42. As earlier indicated, the pressure manifested in conduit 62 is felt in conduit 63 to bring about eventual equalization of pressures in chambers 60 and 61, which, through the action of the centering spring 82 moves valving portion 53 to occlude passage 54 so that damping means 42 can again be effective to prevent undesired oscillations in the system. The position of servo 41 is sensed by potentiometer 47 and fed back to comparator 46 as in the same general manner shown in FIGURE 1.

Whle the foregoing embodiments may be regarded as preferred, it is within the scope of this invention to utilize the present inventive concept in arrangements wherein a change of pressure is not necessarily involved. These include arrangements in which the command signal sensed is an error signal to the servo valve, servo valve motion, actuator feedback position or the like.

FIGURE 3 represents an exemplary embodiment of this invention useable in industrial or military applications in which it may be desirable to control the damping of the system by electrical signals, or interspersed electrical and hydraulic signals. As similarly accomplished in FIGURE 2, servo valve 95 in FIGURE 3 selectively ports pressure fluid to the ends of servo actuator 91 so as to bring about controlled movements of load fitting 93 in the desired manner. The damping effect presented to the system by damping means 92 is controlled by the positioning of the movable member (not shown) in housing 101 representing the damping rate selector. Unlike the embodiment according to FIGURE 2, however, FIGURE 3 involves the use of a comparator 96, the output from which is connected to amplifier 102. A selector switch 103 under the control of the operator, or the pilot as the case may be, determines whether the signal emanating from amplifier 102 is delivered to servo valve 95 to control the positioning thereof, or to an electrical means for positioning the movable member of the damping rate selector. This electrical means may be such as a torque motor 104 mechanically connected to the movable member located in housing 101. A pilot valve and booster 105 may be operatively interconnected between torque motor 104 and the movable member of the damping rate selector to assure a sufficient force for moving the movable member under all operational circumstances. If a pilot valve is employed, it would typically be connected to pressure source 94 such as by a conduit 106.

The pickup 97 employed to indicate the position of the servo actuator may have three outputs, so as to derive a position signal, a velocity signal and an acceleration signal. The position signal is of course delivered to the comparator as in the previous embodiment, whereas the velocity and acceleration signals are delivered to amplifier 102 in order to supply such additional information as may be desirable for the functioning of the device according to this embodiment.

The several embodiments according to this invention lend themselves to use as an infinitely variable lock for hydraulic and high pressure gas actuation systems, as well as for "fail safe" applications, as are so often required for aircraft powered flight controls. For example, either in missile or in machine tools it may be highly desirable to utilize the present invention as an infinitely variable hydraulic lock that locks the actuator in any position it happens to be in upon the loss of system pressure. Alternatively, the present device can be arranged to provide maximum damping effect in the event electrical power in a vehicle is lost, so that an arrangement having safe characteristics for emergency operation may be provided. Other uses would be multi-position locks for positioning devices, hydraulic or pneumatic, as well as for flight surface gust locks operated at the pilot's command for commercial and military aircraft.

We claim:

1. In a fluid servo actuator system employing a compressible fluid, the combination including a servo actuator sensitive to a command signal and adapted to be connected in operative relationship with a load, damping means employing a damping fluid, arranged to prevent undesirable oscillations in said system, and a damping rate selector for controlling the amount of damping effect presented by said damping means, said damping rate selector comprising a housing having therethrough a passage for damping fluid, a valve member movable in sealed relation in said housing and arranged to control the flow of damping fluid through said fluid passage, and means for moving said valve member in response to a command signal to reduce the damping effect presented by said damping means and thereby permit rapid response by said servo actuator to said command signal.

2. The fluid servo actuator system as defined in claim 1 in which said means for moving said valve member includes a pressure sensitive bellows.

3. The fluid servo actuator system as defined in claim 1 in which said means for moving said valve member includes a piston.

4. The fluid servo actuator system as defined in claim 1 in which said means for movng said valve member is responsive to electrical signals.

5. A damping rate selector device comprising a housing, means in said housing providing two chambers to which different fluid pressures may be supplied, a fluid-tight pressure sensitive member in each chamber subjected to the respective pressures of said chambers, a portion of each of said pressure sensitive members being movable, and another portion being fixed with respect to its respective chamber, a movable valve member interconnecting said movable portions of said pressure sensitive members, a control fluid passage in said housing closed by a valving portion of said valve member when said valve member is in a central position, said valve member being movable in either direction away from said central position as a result of a pressure differential between said chambers, said passage when uncovered permitting the flow of control fluid through said housing.

6. The damping rate selector as defined in claim 5 in which said control fluid is associated with a hydraulic dashpot of a fluid servo system, said dashpot having fluid conduit means interconnected with said fluid passage, through which conduit damping fluid may flow when said dashpot is actuated, whereby the impedance of the hydraulic dashpot greatly reduced when said valve member has been moved as a result of the application of different pressures to said chambers.

7. The damping rate selector as defined in claim 5 in which a restricted interconnection is provided between said chambers for bringing about an equalization of pressures therein after a time delay.

8. In combination with a servo actuator and damping means in a servo system employing a compressible fluid, a damping rate selector for controlling the amount of resistance presented by said damping means to the movements of said servo actuator, said damping rate selector comprising a movable member, and a resistance controlling member positioned thereby, said movable member being moved in response to command pressures in said servo system, said resistance controlling member being normally positioned so as to cause said damping means to present substantial resistance to the movements of said servo actuator, but movable away from said normal position in response to command pressures whereby to decrease the resistance of said damping means to permit rapid movement of said servo actuator in response to said command pressures.

9. In a fluid servo actuator system employing a compressible fluid, the combination including a servo actuator sensitive to a command signal and adapted to be connected in operative relation with the load, damping means employing a damping fluid and arranged to prevent undesirable oscillations in said system, and a damping rate selector for controlling the amount of damping effect presented by said damping means, said damping rate selector comprising a housing having a passage for damping fluid, a valving member movable in sealed relation in said housing and arranged to control the flow of damping fluid through said fluid passage, and a piston member operatively connected to be responsive to command pressures in said system to bring about movement of said valving means in either direction away from the position occluding said fluid passage, whereby as a result of command pressure in said system, said damping rate selector is effective to open said fluid passage to bring about reduction of the resistance of said damping means, thereby to allow rapid corrective movements of said servo actuator.

10. A damping rate selector responsive to command signals comprising a housing, means in said housing defining two fluid chambers to which different fluid pressures may be supplied, a restricted interconnection between said chambers, a member movable in said housing in sealed relation therewith, and responsive to the differential of pressures of said chambers, a control fluid passage through said housing, a valving portion on said movable member arranged to occlude said passage when said member is in a central position, said movable member being movable in either direction away from said central position as a result of the existence of a pressure differential between said chambers, means biasing said movable member to said central position, whereby command pressures to one of said chambers will cause said movable member to momentarily move away from said occluding position to allow some flow of control fluid through said housing, the subsequent equalization of pressures in said chambers resulting from said restricted interconnection allowing said biasing means to restore said movable member to said central position.

11. The damping rate selector as defined in claim 10 in in which said fluid chambers are located in opposite ends of a cylinder defined in said housing, said movable member having a piston portion thereon, slidable in sealed relation in said cylinder for bringing about the positioning of said movable member.

12. The damping rate selector as defined in claim 10 in which electrical means are connected to said movable member for the positioning thereof, and a selector switch for directing the application of pressure signals and electrical signals to said movable member.

13. The damping rate selector as defined in claim 10 in which a pair of sensitive means are connected to opposite ends of said movable member for controlling the positioning of said movable member.

References Cited in the file of this patent
UNITED STATES PATENTS

| | | |
|---|---|---|
| 2,225,321 | Schwendner | Dec. 17, 1940 |
| 2,453,328 | Lee | Nov. 9, 1948 |
| 2,676,572 | Perry et al. | Apr. 27, 1954 |
| 2,755,032 | Justus | July 17, 1956 |
| 2,823,685 | Anderson et al. | Feb. 18, 1958 |
| 2,887,999 | Thorner | May 26, 1959 |